United States Patent [19]
Lehrieder et al.

[11] Patent Number: 5,461,851
[45] Date of Patent: Oct. 31, 1995

[54] ROLLER CHAIN

[75] Inventors: Erwin P. J. Lehrieder, Gaukönigshofen; Frans K. Mezger, Lauda/Königshofen, both of Germany

[73] Assignee: Koenig & Bauer Aktiengesellschaft, Wurzburg, Germany

[21] Appl. No.: 272,019

[22] Filed: Jul. 8, 1994

[30] Foreign Application Priority Data

Jul. 9, 1993 [DE] Germany .......................... 43 22 929.8

[51] Int. Cl.⁶ .................................................. F16G 13/06
[52] U.S. Cl. ..................................... 59/4; 59/78; 198/851
[58] Field of Search ..................................... 198/849, 850, 198/851; 59/4, 5, 78

[56] References Cited

U.S. PATENT DOCUMENTS

| | | | |
|---|---|---|---|
| 1,967,496 | 7/1934 | Carr | 198/851 |
| 2,138,317 | 11/1938 | Weiss | 198/851 |
| 4,724,669 | 2/1988 | Kanehira et al. | 59/4 |
| 5,351,811 | 10/1994 | Tisma | 198/851 |

FOREIGN PATENT DOCUMENTS

| | | | |
|---|---|---|---|
| 844470 | 7/1939 | France . | |
| 1168711 | 11/1964 | Germany . | |
| 1930628 | 7/1970 | Germany . | |
| 3725634 | 9/1982 | Germany . | |
| 3048797 | 9/1982 | Germany . | |
| 3842114 | 6/1990 | Germany | 198/851 |
| 1258779 | 9/1986 | U.S.S.R. | 198/851 |
| 1083379 | 9/1967 | United Kingdom . | |
| 2101949 | 1/1983 | United Kingdom | 198/851 |

*Primary Examiner*—David Jones
*Attorney, Agent, or Firm*—Jones, Tullar & Cooper

[57] ABSTRACT

A roller chain for use in drawing paper webs through a web-fed rotary printing press utilizes a plurality of pairs of roller wheels, each joined by transverse roller pins and with each pair of wheels connected to the next adjacent pairs of roller wheels by longitudinally extending leaf-spring plates. The roller chain is capable of twisting and lateral deflections in a direction of the axis of rotation of the roller wheels.

8 Claims, 1 Drawing Sheet

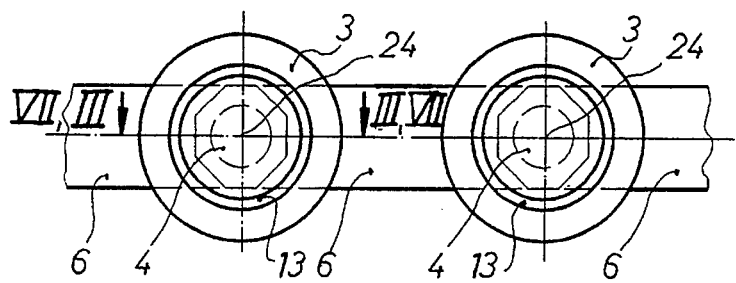
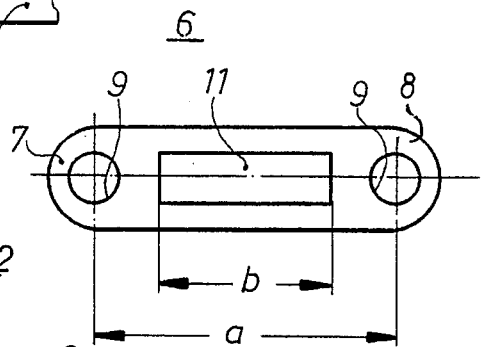
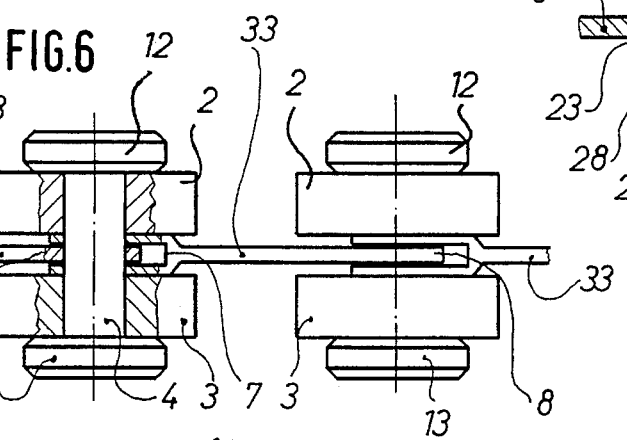
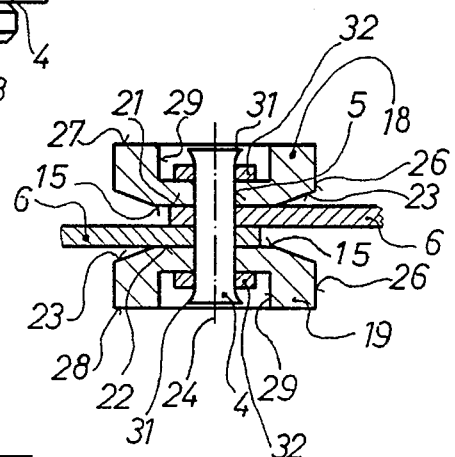
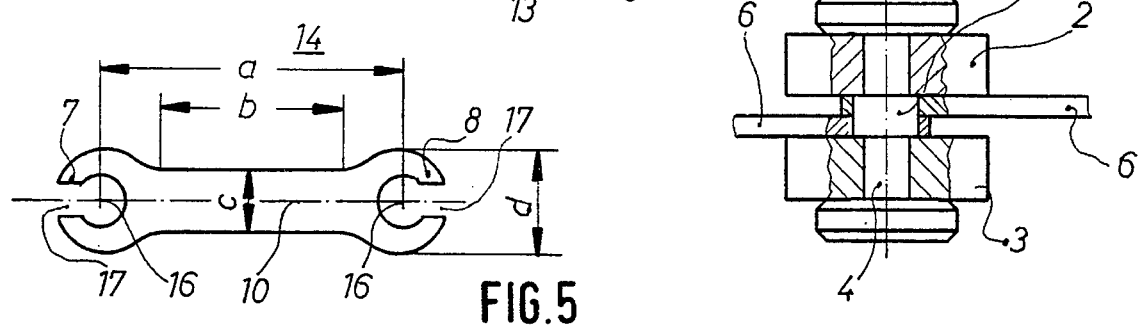
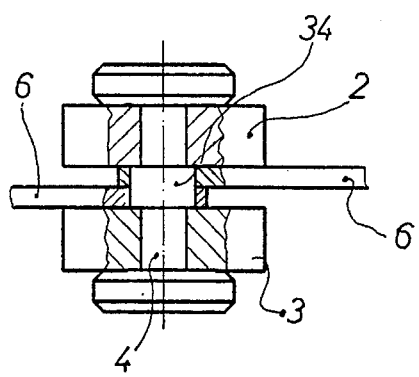

ROLLER CHAIN

FIELD OF THE INVENTION

The present invention is directed generally to a roller chain. More particularly, the present invention is directed to a paper web pulling roller chain. More specifically, the present invention is directed to a paper web pulling roller chain which is laterally flexible. The roller chain is constructed using spaced rollers which are connected by transversely extending pins to form roller pairs. These roller pairs are joined successively to each other by spring plates to form a longitudinally extending endless roller chain that is capable of deflecting laterally. The roller chain thus can bend and twist as it follows a guide track through the press assembly.

DESCRIPTION OF THE PRIOR ART

In web-fed rotary printing presses, it is generally well-known to use roller chains, traveling through guide tracks, to pull the leading edge of a paper web through the printing press. The roller chain is typically provided with web engaging clamps so that the leading edge of the web can be attached to the chain and pulled by the chain through the press assembly. One such prior art roller chain that is intended to be used in pulling a web of material through a web-fed rotary printing press is shown in German Patent Publication DE 30 48 792 C2. This prior art chain utilizes plates or rods which are spaced laterally at a distance from each other. These side plates or rods extend parallel to each other and are hingedly connected together by way of shafts which carry rollers on them. This prior art roller chain is capable of limited twisting or bending movement in the direction of a Z-axis.

A limitation of this prior art roller chain, and of other roller chains that are constructed in a generally similar manner, is their limited motion in the Z-axis and the considerable force which must be applied to the chain to accomplish this lateral deflection of the chain. When such a prior art roller chain traverses a three-dimensional curve or bend in the guide track, as is typically required when the paper web being guided or pulled by the roller chain is drawn in around a turning bar and as far as the first folding gates, a substantial amount of force is required. This exertion of such a large amount of force is the result of the roller chain having to overcome a large amount of resistance which arises from the two parallel extending rods or plates and their resistance to lateral deflection. This large amount of force is also required because of the protruding shafts of the roller chain which are apt to contact the surfaces of the guide track. These factors create a relatively large frictional resistance to the movement of the roller chain through the guide track, particularly when the guide tracks that are typically secured to the side frames of the press form a three-dimensional curve.

It will thus be apparent that a need exists for a roller chain that overcomes the limitations of the prior art devices. The roller chain in accordance with the present invention provides such a device and is a significant improvement over the prior art.

SUMMARY OF THE INVENTION

It is an object of the present invention to provide a roller chain.

Another object of the present invention is to provide a paper web pulling roller chain.

A further object of the present invention is to provide a laterally flexible paper web pulling roller chain.

Yet another object of the present invention is to provide a light weight roller chain.

Yet a further object of the present invention is to provide a roller chain with a central flexible connecting plate.

Even yet another object of the present invention is to provide a roller chain with pins that do not extend beyond the rollers.

Yet still a further object of the invention is to provide a roller chain which creates little frictional drag.

As will be discussed in detail in the description of the preferred embodiments of a roller chain in accordance with the present invention which is set forth subsequently, the roller chain in accordance with the present invention utilizes roller pairs that are joined by transversely extending pins and with the adjacent pins of successive roller pairs being connected by generally central leaf-spring-like plates to form a longitudinally extending roller chain that is provided with a great deal of three-dimensional flexibility. This large amount of flexibility allows the roller chain of the present invention to be drawn through guide tracks that bend and turn without the use of the large pulling forces required by the prior art chains.

Since the roller chain in accordance with the present invention uses a central, longitudinally extending, flexible spring plate to connect adjacent pins of successive roller pairs, instead of the prior art arrangement of parallel spaced plates, the roller chain in accordance with the present invention is capable of substantially greater spatial mobility. The roller chain can thus accomplish limited bending in the Z-axis direction. This allows the roller chain of the present invention to move much more freely through guide tracks that follow a path in a printing machine from a reel changer through the press and around the turning bar. The mobility of the roller chain in accordance with the present invention is provided by the leaf-spring-like plates and is enhanced by the use of rollers having beveled lateral inner faces which are oriented toward the leaf-spring plates. These laterally beveled inner faces of the rollers make it much easier for them to follow a turning or twisting guide path. Additionally, the roller chain in accordance with the present invention has no protruding ends of its roller pins. This also significantly reduces frictional drag as the roller chain passes through the guide track.

The roller chain in accordance with the present invention overcomes the limitations of the prior art devices. It is a substantial advance in the art.

BRIEF DESCRIPTION OF THE DRAWINGS

While the novel features of the roller chain in accordance with the present invention are set forth with particularity in the appended claims, a full and complete understanding of the invention may be had by referring to the detailed description of the preferred embodiments which is presented subsequently, and as illustrated in the accompanying drawings, in which:

FIG. 1 is a side elevation view of a first preferred embodiment of a roller chain in accordance with the present invention;

FIG. 2 is a top plan view, partly in cross-section, of the roller chain of FIG. 1;

FIG. 3 is a top sectional view of a portion of a second preferred embodiment of a roller chain in accordance with the present invention, and taken along line III—III of FIG. 1;

FIG. 4 is a side elevation view of a first preferred embodiment of a leaf-spring-plate for a roller chain of the present invention;

FIG. 5 is a side elevation view of a second preferred embodiment of a leaf-spring-plate;

FIG. 6 is a top plan view of a roller chain, partly in section, and showing a third preferred embodiment of a leaf-spring-plate; and FIG. 7 is a top plan view of a roller chain and showing a second preferred embodiment of a pin in accordance with the present invention.

DESCRIPTION OF PREFERRED EMBODIMENTS

Referring initially to FIG. 1, there may be seen generally at 1 a first preferred embodiment of a roller chain in accordance with the present invention. Roller chain 1, as may also be seen in FIG. 2, is comprised of successive, longitudinally spaced pairs of rollers 2 and 3, with each such pair of rollers 2 and 3 being connected by a transverse roller pin 4. As may be seen in FIG. 2, each roller 2 or 3 has a central bore 5 which receives the transverse roller pin 4. Each pin 4 of each roller pair 2 and 3 is connected to each of its successively, longitudinally adjacent roller pairs by a leaf-spring-like plate 6 or by a longitudinally extending plate 6 which has a leaf-spring-like effect. These leaf-spring connecting plates 6, as may be seen most clearly in FIG. 4 have generally rounded ends 7 and 8 with the ends of two such leaf-spring plates being placed adjacent each other on a roller pin 4 in a generally overlapping manner, as may be seen most clearly in FIG. 2, with the overlapping ends 7 and 8 of the two leaf-spring plates 6 being located on the roller pin 4 between the two laterally spaced rollers 2 and 3 in each roller pair.

Again referring primarily to FIG. 3, each leaf-spring plate 6 preferably has its ends 7 and 8 rounded and is provided with roller pin receiving seating bores 9 at both ends. A central aperture 11, which may have a generally rectangular shape, is situated in the middle of the leaf-spring plate 6 between the pin receiving seating bores 9. In the first preferred embodiment, the seating bores 9 are spaced apart by a distance "a" while the rectangular central aperture 11 has a length "b". Preferably the length "b" is generally one-half of the distance "a" between the spaced sealing bores 9 in the ends 7 and 8 of the leaf-spring plate 6. The central aperture 11 is centered along the longitudinal axis 10 of the plate 6 and is used to reduce the cross-sectional area of the spring-plate 6 and to thereby increase its flexibility.

Each chain roller pin 4 can consist of a two-part assembly with a swaged head 12 and a snap head 13, as may be seen in FIGS. 1 and 2. A sleeve, which is not specifically shown in FIGS. 1 and 3, can be placed about the roller pin between its two ends and can be used as a spacer for the two heads 12 and 13 of the roller pin 4. Alternatively, the roller pin 4 can also be provided as a bolt with a nut and a securing element. It is also possible to provide the roller pin 4 as a hollow, cylindrical pipe-like element and to flair or widen it at both ends after the rollers 2 and 3 or 18 and 19 and the ends 7 and 8 of the appropriate spring-plates 6 have been placed on the roller pin 4. Prior to the widening of the ends of the roller pin 4, stop disks 32 or washers are placed on the ends of pin 4, as may be seen in FIG. 3. It would also be possible to crimp or otherwise deform the two ends of the pin 4 in order to retain the rollers 2 and 3 on the roller pin 4.

A second preferred embodiment of a leaf-spring plate, generally at 14, is shown more clearly in FIG. 5. This second embodiment of leaf-spring plate 14 has seating bores 16 disposed at the ends 7 and 8, with these seating bores 16 being used to receive a roller pin 4 generally in the same manner as is used with plate 6. Each of these seating bores 16 in plate 14 have split or open ends 17. These slits 17 are smaller in width than the diameter of the seating bores 16 and therefore act as overload protection against increased tensional strain on the roller chain 1. As may be seen in FIG. 5, the plate 14 is generally dog-bone shaped with a reduced central waist between the ends 7 and 8. The spacing between the centers of the seating bores is again "a". The width of the central waist is designated as "c" and the length of the central waist portion is designated as "b". The overall height of the leaf-spring plate is designated as "d". Preferably, the width "c" is generally 0.5 to 0.7 times the overall height "d" of the leaf-spring plate 14.

A second preferred embodiment of rollers 18 and 19 for use in the roller chain 1 of the present invention is shown most clearly in FIG. 3. Each of these rollers 18 and 19 has an inner beveled surface 23 on first or inner lateral faces 21 and 22 with these inner lateral faces 21 and 22 being adjacent the leaf-spring plate 6. The inner beveled surfaces 23 extend from outer peripheral load bearing surface 26 of the rollers inwardly toward a central axis of rotation 24 of each roller 18 or 19. In this embodiment of the rollers 18 and 19, it is also beneficial if the first lateral faces 21 and 22 of the rollers 18 and 19, respectively also each has a surface 15 in the vicinity of their axis of rotation 24 against which both of the leaf-spring plate ends 7 and 8 can bear. This provides for better guidance and support of the leaf-spring plates 6. The bevels 23 on the inner edges of the rollers 18 and 19 reduce the width of the peripheral bearing surfaces 26 and make it possible to increase the deflection of the leaf-spring plates 6 and 14 between the longitudinally adjacent roller pins 4. This greater freedom of deflection of the plates 6 or 14 allows even greater movement of the roller chain in the Z-axis which extends parallel to the axis of rotation 24 of the pins 4 and the rollers 3 and 4 or 18 and 19 of the roller chain 1.

As may be also seen most clearly in FIG. 3 and in further accordance with the second preferred embodiment of the rollers 18 and 19, each roller can be provided with a recessed central bore 29 which extends inwardly along the axis of rotation 24 from second outer faces 27 and 28 of the rollers 18 and 19. These second outer lateral faces 27 and 28 face away from the leaf-spring plates 6 or 14. These central recesses or central bores 29 receive the outer ends of the roller pins 4. If these ends have been enlarged or widened or are formed as a part of a two-part pin 4, the securing means 31 of the pin 4 will be received in the central recess 29 and will not extend out beyond the outer faces 27 and 28 of the rollers 18 or 19, respectively. Thus the roller chain 1 will have a smooth outer profile when viewed in its direction of travel.

A third preferred embodiment of a leaf-spring plate, generally at 33, in accordance with the present invention is shown in FIG. 6. In this embodiment, one end 7 of each leaf-spring plate 33 is generally fork-shaped and is sized to receive the other end 8 of the next adjacent plate 33 between the two spaced tines of the fork-shaped end 7. The advantage of this type of leaf-spring plate 33 is that shear or traction loads transmitted by the leaf-spring plate 33 to the roller pin 4 are transmitted directly to the center of the pin 4. This means that the pin 4 does not tilt.

Another preferred embodiment of a roller pin in accordance with the present invention is shown generally at 4 in FIG. 7. In this fourth embodiment, the pin 4 has a collar 34 at its center. This collar 34 is sized to be receivable in the seating bores 9 of the leaf-spring plates 6. The use of the sleeve or collar 34 thus reduces the frictional drag between the roller pin 4 and the leaf-spring plates 6.

The leaf-spring plates 6, 14 or 33 may be made from a number of suitable materials, such as, for example spring sheet steel; fiberglass-reinforced plastic or similar materials. The leaf-spring plates can be made, for example, of spring steel with a modulus of transverse elasticity G of 81.5 kN/mm² and a modulus of elasticity E of 206 kN/mm². The leaf-spring plates 6, 14 and 33 can also be made of a plastic material such as polyethylene, or of Polyamide 6 with, for example, a 30% proportion of fiberglass and with a modulus of elasticity E of 8500 kN/mm². The rollers 2, 3, 18 and 19 can also be made of a plastic material, such as polyamide.

While preferred embodiments of a roller chain in accordance with the present invention have been set forth fully and completely hereinabove, it will be apparent to one of skill in the art that a number of changes in, for example the overall size of the roller chain, the types of paper web engaging clamps used with the chain, the speed of travel of the chain and the like can be made without departing from the true spirit and scope of the present invention which is accordingly to be limited only by the following claims.

What is claimed is:

1. A roller chain useable to draw a web of material along guide tracks in a web-fed rotary printing pres, said roller chain comprising:

a plurality of longitudinally spaced pairs of rollers each of said pairs of rollers having first and second rollers, said first and second rollers in each of said pair of rollers being laterally spaced from each other;

a roller pin extending between said first and second laterally spaced rollers in each of said pairs of rollers, said first and second rollers in each said pair of rollers being seated on first and second ends of said roller pin, each said roller pin having a central transversely extending axis of rotation about which said first and second rollers in each of said roller pairs rotates; and a single, central longitudinally extending flexible leaf-spring plate extending longitudinally between each of said two longitudinally adjacent pairs of rollers in said roller chain, each of said flexible leaf-spring plates having roller pin receiving bores adjacent first and second ends through which said roller pins of said longitudinally adjacent pairs of rollers extend, a first end of a first spring plate being situated on one of said roller pins laterally adjacent a second end of a second spring plate, said spring plates being positioned intermediate said first and second rollers in each of said roller pairs to form said roller chain.

2. The roller chain of claim 1 wherein each of said spaced rollers has a first lateral face adjacent said leaf-spring plate and further wherein said first lateral face has a bevel extending from a peripheral bearing surface of each roller toward an axis of rotation of said roller.

3. The roller chain of claim 1 wherein each of said leaf-spring plates has a reduced central area intermediate said first and second ends and extending in a direction of a longitudinal axis of said leaf-spring plate.

4. The roller chain of claim 1 wherein each of said leaf-spring plates has a slit extending from said roller pin receiving bore in each end of said plate to said adjacent end of each plate.

5. The roller chain of claim 2 wherein each of said rollers has a second lateral face positioned away from said leaf-spring plate and further wherein each of said second faces has a recess aligned with an axis of rotation of each roller, said recess receiving an end of each roller pin upon which said roller is seated.

6. The roller chain of claim 1 wherein each of said leaf-spring plates is made of spring steel.

7. The roller chain of claim 1 wherein each of said leaf-spring plates is made of plastic.

8. The roller chain of claim 1 wherein one of said first and second ends of each of said leaf-spring plates is fork-shaped.

* * * * *